United States Patent
Ho (12)

(10) Patent No.: US 6,452,922 B1
(45) Date of Patent: Sep. 17, 2002

(54) METHOD AND APPARATUS FOR FALLBACK ROUTING OF VOICE OVER INTERNET PROTOCOL CALL

(75) Inventor: Anthony Ho, Fremont, CA (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/219,018

(22) Filed: Dec. 23, 1998

Related U.S. Application Data

(60) Provisional application No. 60/089,831, filed on Jun. 19, 1998, and provisional application No. 60/090,075, filed on Jun. 19, 1998.

(51) Int. Cl.[7] .............................................. H04L 12/66
(52) U.S. Cl. ..................................... 370/352; 370/237
(58) Field of Search ................................ 370/252, 352, 370/353, 354, 355, 356, 435, 238, 395.21, 395.52, 401, 237, 230; 379/220, 221

(56) References Cited

U.S. PATENT DOCUMENTS

| 5,553,128 | A | | 9/1996 | Grimes |
|---|---|---|---|---|
| 5,610,910 | A | | 3/1997 | Focsaneanu et al. |
| 5,903,558 | A | * | 5/1999 | Jones et al. ............... 370/351 |
| 6,064,653 | A | * | 5/2000 | Farris et al. .............. 370/237 |
| 6,097,699 | A | * | 8/2000 | Chen et al. ............... 370/231 |
| 6,154,445 | A | * | 11/2000 | Farris et al. .............. 370/237 |
| 6,188,698 | B1 | * | 2/2001 | Galand et al. ............. 370/412 |
| 6,282,192 | B1 | * | 8/2001 | Murphy et al. ............ 370/352 |
| 6,324,280 | B2 | * | 11/2001 | Dunn et al. ............... 379/230 |

FOREIGN PATENT DOCUMENTS

| GB | 2300089 | 10/1996 |
|---|---|---|
| WO | WO 97/27692 | 7/1997 |

OTHER PUBLICATIONS

T.F. Houghton et al.; A Packet Telephony Gateway for Public Network Operators; XVI World Telecom Congress Proceedings, Sep. 21, 1997; pp. 35–44.

* cited by examiner

Primary Examiner—Chau Nguyen
Assistant Examiner—Alexander Boakye
(74) Attorney, Agent, or Firm—Blakely, Sokoloff, Taylor & Zafman LLP

(57) ABSTRACT

An apparatus causes alternate connection of a telephone call directed to an IP network if the quality of service provided by the IP network is less than a predetermined threshold. A network monitor measures a transmission rating factor for the IP network. An IP network interface, coupled to the network monitor, an originating system, and the IP network, receives the telephone call for a dialed number from the originating system. The IP network interface causes the originating system to connect the telephone call through a first network if the measured transmission rating factor for the IP network is less than the desired transmission rating factor, and connects the telephone call through the IP network otherwise.

15 Claims, 2 Drawing Sheets

METHOD AND APPARATUS FOR FALLBACK ROUTING OF VOICE OVER INTERNET PROTOCOL CALL

CROSS-REFERENCES TO RELATED APPLICATIONS

This application claims the benefit of U.S. Provisional Application No. 60/089,831, filed Jun. 19, 1998, which is incorporated herein by reference, and of U.S. Provisional Application No. 60/090,075, filed Jun. 19, 1998, which is incorporated herein by reference.

BACKGROUND OF THE INVENTION

1. Field of the Invention

This invention relates to connecting of telephone calls and, more particularly, to connecting of telephone calls over internet protocol networks.

2. Background Information

The traditional telephone network is a switched network that provides users with a dedicated end-to-end circuit for the duration of each call. Circuits are reserved between the originating switch, tandem switches (if any), and the terminating switch based on the called party number to create the end-to-end circuit.

Recently, telephone calls have been transmitted over digital networks using packet switched internet protocol (IP) networks, termed voice over IP (VoIP) transmission. Packet-switched IP networks provide shared, virtual circuit connections between users. Voice information to be transmitted across an IP network is converted into digital data and broken up into multiple, discrete packets. Individual packets may travel over different network paths to reach the final destination where the packets are reassembled in the proper sequence to reconstruct the original voice information. The transmission speed between any two users can change dramatically based on the dynamic number of users sharing the common transmission medium, their bandwidth requirements, the capacity of the transmission medium, and the efficiency of the network routing and design.

VoIP transmission typically costs less than transmission over traditional public switched telephone networks (PSTNs). A disadvantage of VoIP networks is the variability of the quality of the signal received at the destination as determined by changing network conditions. The received signal quality depends on a large number of variable network factors such as packet loss, packet latency, queuing delay, and bandwidth availability. These network factors will vary depending on the volume of network traffic and the location of the destination. The IP network, unlike the traditional public switched network, is not uniformly or predictably suitable for voice quality transmission.

Prior art systems for connecting calls over IP networks have monitored the quality of service (QoS) provided by the network and disabled the gateway to the IP network when QoS fell below an acceptable level. However, QoS is not a uniform characteristic in an IP network. QoS is dependent on the destination and it may be unacceptable for transmissions to one destination but be acceptable to another destination. Accordingly, what is needed is a method and apparatus for monitoring the quality of service (QoS) of the IP network and connecting a telephone call over an alternate network, on a call by call basis, if the QoS of the IP network is unacceptable based on the destination for the call.

SUMMARY OF THE INVENTION

An apparatus causes alternate connection of a telephone call directed to an IP network if the quality of service provided by the IP network is less than a predetermined threshold. A network monitor measures a transmission rating factor for the IP network. An IP network interface, coupled to the network monitor, an originating system, and the IP network, receives the telephone call for a dialed number from the originating system. The IP network interface causes the originating system to connect the telephone call through a first network if the measured transmission rating factor for the IP network is less than the desired transmission rating factor, and connects the telephone call through the IP network otherwise.

DETAILED DESCRIPTION OF THE INVENTION

The present invention provides a method and apparatus for monitoring the quality of service (QoS) of the internet protocol (IP) network and connecting a telephone call over an alternate network, on a call by call basis, if the QoS of the IP network is unacceptable based on the destination for the call.

Figure 1:
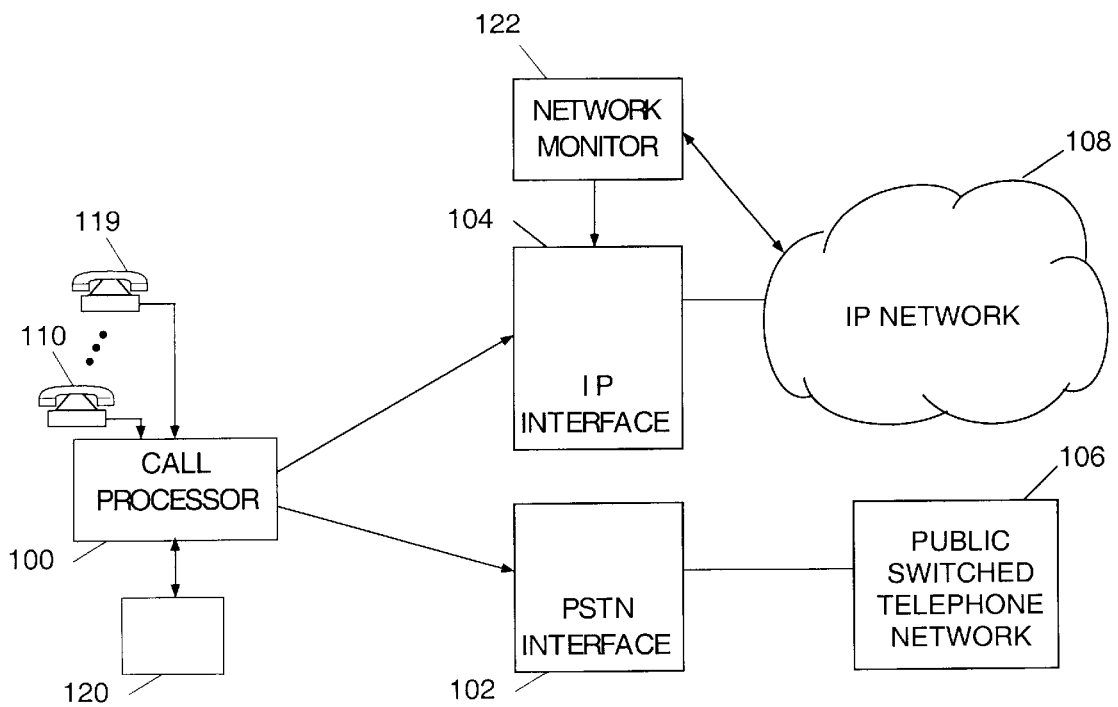
FIG. 1 shows an embodiment of the invention.

FIG. 1 is an exemplary system for providing voice over IP (VoIP). The system includes a call processor 100 that receives a telephone call from a local user 110, including a destination telephone number, and a plurality of network interface cards 102, 104 to provide connections to networks 106, 108 capable of carrying telephone calls, including at least one network interface card 104 that provides a connection to an IP network 108. The call processor 100 uses the telephone number of the received call to consult a routing table 120 and identify a network interface card 102, 104 that can provide a connection for the telephone call.

A network interface card 104 that provides a connection to the IP network 108 and contains an embodiment of the present invention, will cause a call directed to the card to be redirected to a different network 106 if the QoS for the call will be below the desired threshold based on the destination of the call. The IP interface card 104 receives the call to be connected through the IP network 108 and a desired QoS for the call. The desired QoS may be received with the call, or in advance of the call as a general level of QoS desired, possibly based on one or more call characteristics. The IP network card 104 uses the destination of the call to be connected to consult statistics collected by a network monitor 122 that runs on the card. The statistics for the IP network 108 QoS to the destination of the call to be routed are compared to the desired QoS for the call. If the QoS that the IP network 108 has provided recently for test packets to the destination of the call to be routed is less than the desired QoS threshold, then the call is returned to the call processor 100 to be connected through another network 106. Otherwise, the call is connected through the IP network 108.

Figure 2:
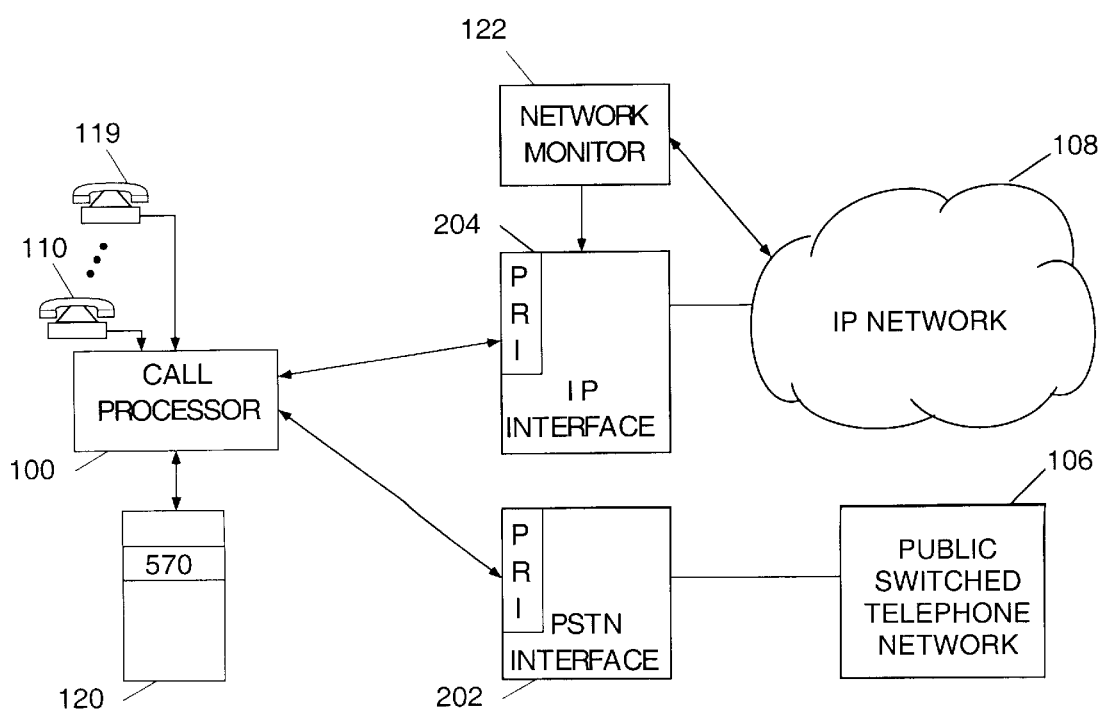
FIG. 2 shows a second embodiment of the invention that uses an ISDN PRI interface.

FIG. 2 shows an embodiment of the invention in which the IP network card 204 is an integrated services digital network (ISDN) to IP gateway that provides a primary rate interface (PRI) to the call processor. In this embodiment, the IP network interface 204 sends an ISDN call reject signal to the call processor 100 if the call cannot be connected through the IP network 108 because of a low QoS. The call processor 100 will then use an alternate connection through another network interface 202 according to ISDN protocol.

Figure 3:
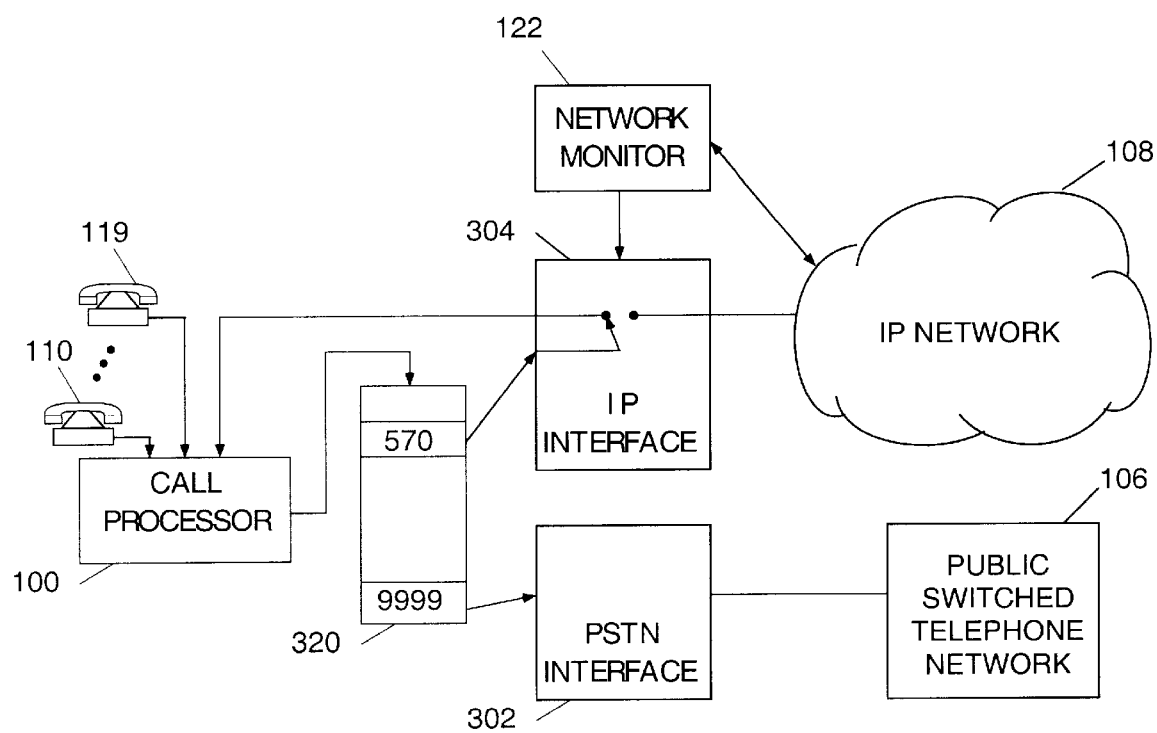
FIG. 3 shows a third embodiment of the invention that uses an analog trunk loop back path.

FIG. 3 shows another embodiment of the invention in which the IP network interface 304 emulates an analog trunk interface. In this embodiment, the IP network interface 304 contains a loop back path that allows the IP network interface 304 to send a call to the call processor 100. If the call cannot be connected through the IP network 108 because of a low QoS, the IP network interface 304 will connect the call to the call processor 100 through the loop back path and give the call a special number to force a connection through an alternate network 106. In one embodiment, the special number includes a special prefix, such as 9999, that is placed at the front of the original called number. When the call processor 100 receives the looped back call, it directs the call to an alternate network interface 302 because of the special called number that was attached to the call by the network card. The looped back call is not distinguishable from other call received by the call processor 100 except for the special routing number. The following is an exemplary call setup sequence for fall back to PSTN of a call directed to the IP network in an embodiment of the invention emulating an analog trunk interface:

Step 1: A user 110 calls a destination by dialing a number such as "6-570-1234";

Step 2: The call processor 100 receives the call and, based on the prefix of the dialed number, the call processor 100 finds a matching entry in a routing table 120 and directs the call to the IP network interface 304;

Step 3: The IP network interface 304 tests the QoS statistics generated by the network monitor 122 for the destination IP address of the call;

Step 4: If the QoS is less than a supplied desired QoS threshold, the IP network interface 304 inserts the special prefix "9999" in the dialed number and connects the call to the call processor 100 through a loop back path;

Step 5: The call processor 100 receives the call generated by the IP network interface 304 with the called party number of "6-9999-570-1234";

Step 6: The call processor 100 finds a matching entry in the routing table 120 for the special prefix "9999," and, based on the routing information, the call processor deletes the first five digits and directs a call to "570-1234" to the PSTN network interface 302.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those oridinarly skilled in the art.

What is claimed is:

1. An apparatus comprising:
    a network monitor that measures a transmission rating factor for an IP network; and
    an IP network interface, coupled to the network monitor, an originating system, and the IP network, the IP network interface to receive a desired transmission rating factor, the measured transmission rating factor, and a telephone call for a dialed number, the IP network interface to replace the dialed number with a special number based on the dialed number and to connect the telephone call for the special number to the originating system if the measured transmission rating factor for the IP network is less than the desired transmission rating factor, and to connect the telephone call through the IP network otherwise.

2. The apparatus of claim 1, where the IP network interface further appends the dialed number to a special fall back location code.

3. The apparatus of claim 1, where the network monitor periodically measures transmission characteristics for test packets sent to a destination IP address associated with the telephone call.

4. A method of connecting a telephone call for a dialed number through one of a first network and an IP network, comprising:
    receiving the telephone call to be connected from an originating system;
    receiving a desired transmission rating factor;
    measuring a transmission rating factor for the IP network;
    comparing the desired transmission rating factor to the measured transmission rating factor for the IP network;
    if the measured transmission rating factor for the IP network is less than the desired transmission rating factor,
    replacing the dialed number with a special number based on the dialed number; and
    connecting the telephone call for the special number to the originating system; and
    connecting the telephone call through the IP network otherwise.

5. The method of claim 4, where replacing the dialed number with the special number further comprises appending the dialed number to a special fall back location code.

6. The method of claim 4, where measuring the transmission rating factor further comprises periodically measuring transmission characteristics for test packets sent to a destination IP address associated with the telephone call.

7. A telephone system comprising:
    a call processor that receives a telephone call including a dialed number and directs the telephone call to one of a plurality of network cards comprising a first network card and an IP network card;
    the IP network card further comprising,
    a network monitor that measures a transmission rating factor for an IP network; and
    an IP network interface, coupled to the network monitor, the call processor, and the IP network, the IP network interface to receive a desired transmission rating factor, the measured transmission rating factor, and the telephone call, the IP network interface to replace the dialed number with a special number based on the dialed number and to connect the telephone call for the special number to the call processor if the measured transmission rating factor for the IP network is less than the desired transmission rating factor, and to connect the telephone call through the IP network otherwise.

8. The telephone system of claim 7, where the IP network interface further appends the dialed number to a special fall back access code.

9. The telephone system of claim 7, where the network monitor periodically measures transmission characteristics for test packet sent to a destination IP address associated with the telephone call.

10. An apparatus comprising:
    a network monitor that measures a transmission rating factor for an IP network;
    an IP network interface, coupled to the network monitor, an originating system, and the IP network, that receives a telephone call for a dialed number from the originating system, and that returns an ISDN call reject signal to the originating system to cause the originating system to connect the telephone call through a first network if the measured transmission rating factor for the IP network is less than the desired transmission rating factor, and connects the telephone call through the IP network otherwise.

an IP network interface, coupled to the network monitor, an originating system, and the IP network, the IP network interface to receive a desired transmission rating factor, the measured transmission rating factor, and a telephone call for a dialed number, the IP network interface to return an ISDN call reject signal to the originating system to cause the originating system to connect the telephone call through a first network if the measured transmission rating factor for the IP network is less than the desired transmission rating factor, and to connect the telephone call through the IP network otherwise.

11. The apparatus of claim 10, where the network monitor periodically measures transmission characteristics for test packets sent to a destination IP address associated with the telephone call.

12. A method of connecting a telephone call for a dialed number through one of a first network and an IP network, comprising:

receiving the telephone call to be connected from an originating system;

receiving a desired transmission rating factor;

measuring a transmission rating factor for the IP network;

comparing the desired transmission rating factor to the measured transmission rating factor for the IP network;

returning an ISDN call reject signal to the originating system to cause the originating system to route the telephone call through the first network if the measured transmission rating factor for the IP network is less than the desired transmission rating factor; and connecting the telephone call through the IP network otherwise.

13. The method of claim 12, where measuring the transmission rating factor further comprises periodically measuring transmission characteristics for test packets sent to a destination IP address associated with the telephone call.

14. A telephone system comprising:

a call processor that receives a telephone call including a dialed number and directs the telephone call to one of a plurality of network cards comprising a first network card and an IP network card;

the IP network card further comprising, a network monitor that measures a transmission rating factor for an IP network; and an IP network interface, coupled to the network monitor, the call processor, and the IP network, the IP network interface to receive a desired transmission rating factor, the measured transmission rating factor, and the telephone call, the IP network interface to return an ISDN call reject signal to the call processor to cause the call processor to route the telephone call through the first network card if the measured transmission rating factor for the IP network is less than the desired transmission rating factor, and to connect the telephone call through the IP network otherwise.

15. The telephone system of claim 14, where the network monitor periodically measures transmission characteristics for test packets sent to a destination IP address associated with the telephone call.

* * * * *